No. 682,520. Patented Sept. 10, 1901.
A. F. BERRY.
ELECTRICAL TRANSFORMER.
(Application filed Jan. 23, 1901.)

(No Model.) 5 Sheets—Sheet 1.

Witnesses.
Geo. E. Fuch.
Chas. T. Wright.

Inventor
A. F. Berry
by A. S. Pattison
Atty.

No. 682,520. Patented Sept. 10, 1901.
A. F. BERRY.
ELECTRICAL TRANSFORMER.
(Application filed Jan. 23, 1901.)
(No Model.) 5 Sheets—Sheet 2.
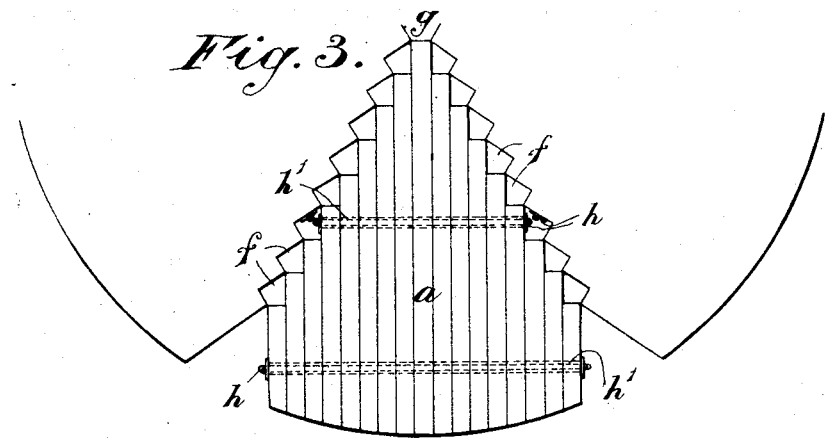
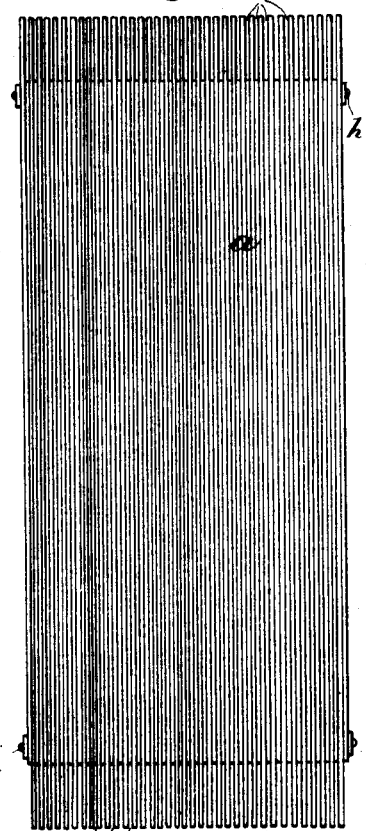
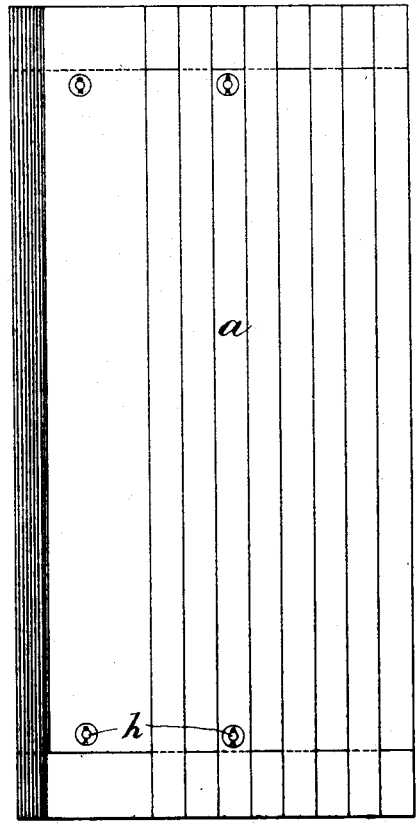

No. 682,520. Patented Sept. 10, 1901.
A. F. BERRY.
ELECTRICAL TRANSFORMER.
(Application filed Jan. 23, 1901.)
(No Model.) 5 Sheets—Sheet 3.
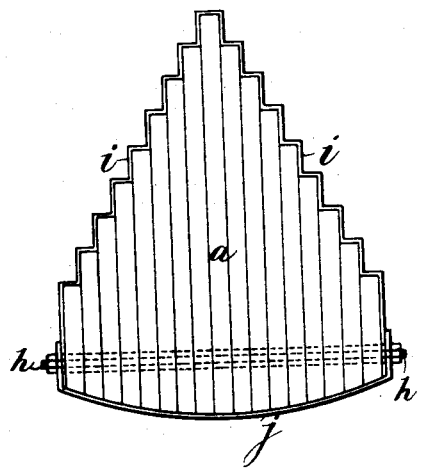
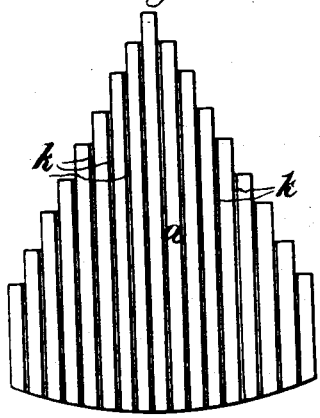
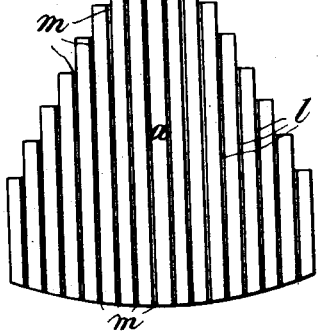

No. 682,520. Patented Sept. 10, 1901.
A. F. BERRY.
ELECTRICAL TRANSFORMER.
(Application filed Jan. 23, 1901.)
(No Model.) 5 Sheets—Sheet 4.
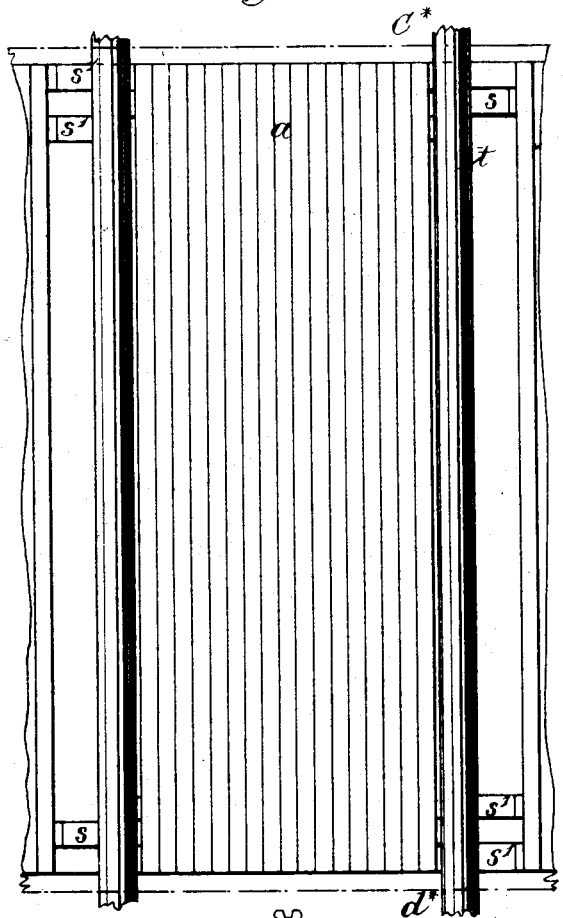
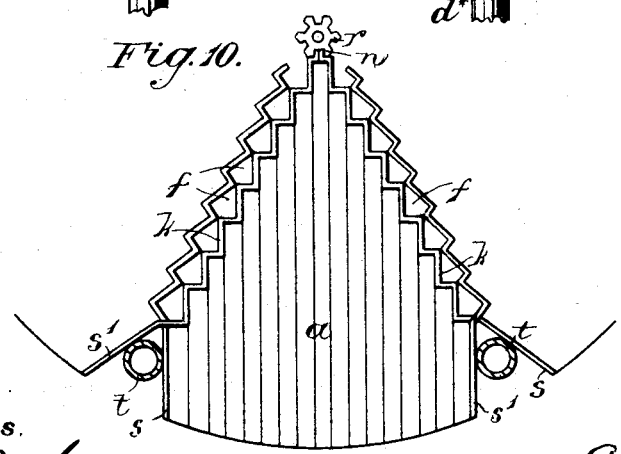

No. 682,520. Patented Sept. 10, 1901.
A. F. BERRY.
ELECTRICAL TRANSFORMER.
(Application filed Jan. 23, 1901.)

(No Model.) 5 Sheets—Sheet 5.

Witnesses.
Geo. E. Frech.
Chas. R. Wright.

Inventor
A. F. Berry,
by A. S. Pattison atty

UNITED STATES PATENT OFFICE.

ARTHUR FRANCIS BERRY, OF LONDON, ENGLAND.

ELECTRICAL TRANSFORMER.

SPECIFICATION forming part of Letters Patent No. 682,520, dated September 10, 1901.

Application filed January 23, 1901. Serial No. 44,429. (No model.)

*To all whom it may concern:*

Be it known that I, ARTHUR FRANCIS BERRY, a subject of the Queen of Great Britain and Ireland, residing at Harrow road, London, England, have invented Improvements in Electrical Transformers, of which the following is a specification.

This invention has reference to further improvements in electrical transformers of the type described in the specification of former Letters Patent granted to me—viz., No. 639,505; and it has for objects to facilitate the construction and lessen the cost of such transformers, to adapt the same for the generation of diphase or polyphase currents, and to provide for the efficient cooling of the windings of such transformers.

It consists for these purposes in an improved construction of the central portion of the iron core that passes through the primary and secondary windings of the transformer, in an improved construction of the laminated plates, so as to provide two or more circuits for magnetic flux, in an improved construction of one or some of the windings, so as to provide for the cooling thereof, and in certain details of construction, all as hereinafter more fully described, and pointed out in the claims.

Figure 1:
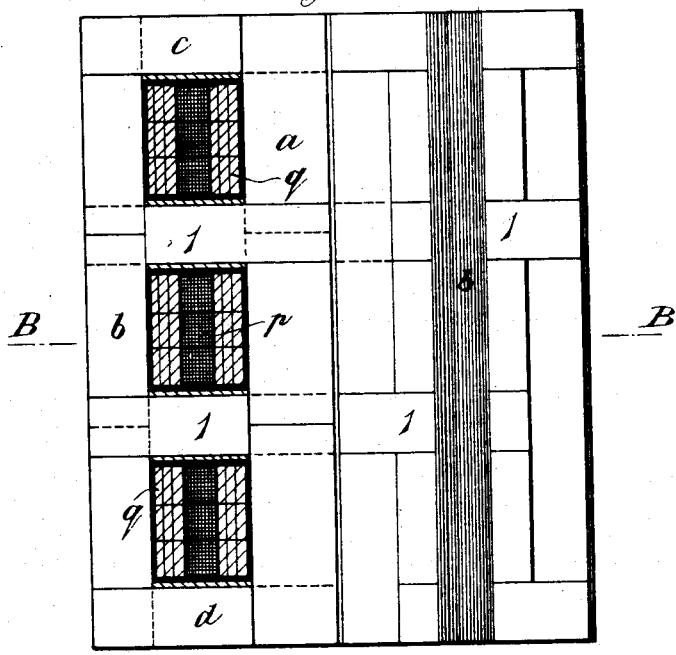
Figure 2:
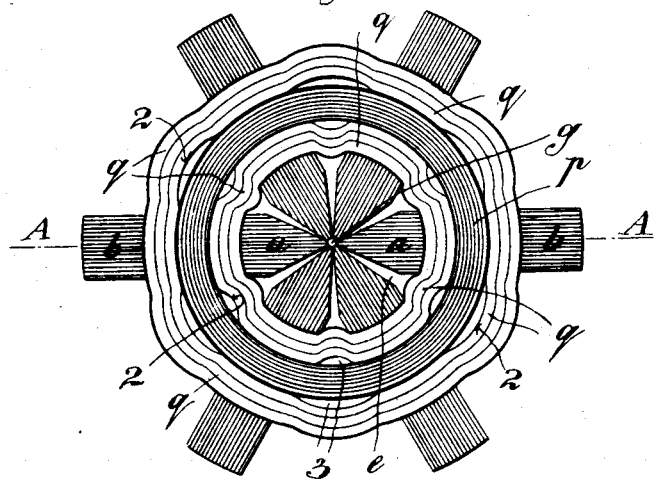
Figure 11:
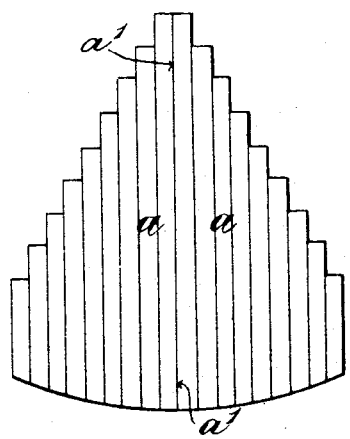
Figure 12:
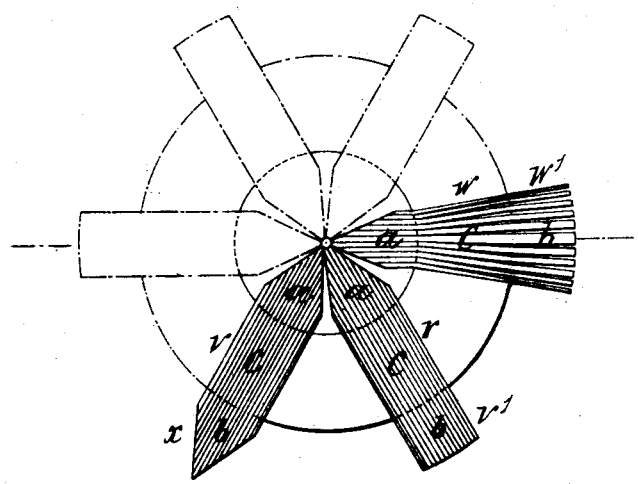

In the accompanying illustrative drawings, Figure 1 shows partly in side elevation and partly in vertical section on the line A A of Fig. 2, and Fig. 2 in horizontal section on the line B B of Fig. 1, one construction of electrical transformer embodying my present invention. Fig. 3 shows in plan and to a larger scale than Figs. 1 and 2 a different construction of one of the laminated sector-shaped blocks for forming the central portion of the transformer-core. Figs. 4 and 5 are elevations taken at right angles to one another of the block shown in Fig. 3. Figs. 6, 7, and 8 are similar views to Fig. 3, showing modified constructions of sector-shaped blocks. Fig. 9 is a part side elevation, and Fig. 10 a part plan, showing a modified way of building up the sector-shaped blocks. Fig. 11 shows in plan another construction of sector-shaped block. Fig. 12 is a plan showing various ways in which the groups of iron strips constituting the top, bottom, and outside members of the laminated plates forming the transformer-core can be arranged.

$a$ and $b$, Figs. 1 and 2, are respectively the inner and outer sides or legs, and $c$ and $d$ the top and bottom members, of the laminated outwardly-extending iron plates forming the core, through which the primary and secondary windings $p$ and $q$, respectively, extend in a manner well understood and as described in my said former specification, each vertical side or leg and each top and bottom member being composed of straight strips of thin sheet-iron, as before. According to this invention the vertical straight strips of thin sheet-iron constituting the inner sides or legs $a$ of the laminated iron plates $a\ b\ c\ d$ are made of different widths, such that when the strips are placed adjacent to each other around a common center they form, as seen in plan, sector-shaped or approximately sector-shaped blocks or bundles of iron strips, the widest strip or strips in each block or bundle extending to or nearly to the center of the core, and the strips on one or each side of the widest strip or strips being of successively less width, the arrangement, moreover, being such that passages are or may be left between the adjacent sides or some of them, and it may be between the inner ends of the several sector-shaped blocks or bundles of strips, (hereinafter called "blocks $a$,") which are arranged to constitute the central portion of the core that extends through the primary and secondary coils.

In Figs. 1 and 2 each of the sector-shaped blocks $a$ is composed of a number of straight strips of iron, the central one of which is the widest and those on each side of the central one are of successively less width, the block being made of such dimensions as to leave vertical spaces or channels $e$ between its sides and the sides of the adjacent sector-shaped blocks $a$. The strips of iron composing each block are for the sake of clearness shown as simple lines separated from each other; but they would of course in actual construction be placed close against each other.

In practice each block $a$ preferably comprises, as shown in Figs. 3 to 10, inclusive, a central group of vertical straight strips of iron having the greatest width, and on each side of such central group a number of other groups of vertical strips of iron of successively less width, but with the strips in each group of the same width, so that the sides of the resulting sector-shaped block composed of the several groups of strips have a step-like shape and when placed adjacent to similarly-shaped blocks of iron strips to constitute the central portion of the core, as shown in Figs. 3, 6, and 10, form with such other blocks a number of vertical four-sided ventilating or cooling holes or passages $f$, a vertical ventilating or cooling hole or passage $g$ of polygonal shape being also formed by and between the inner ends of the central groups of strips in the several blocks.

The iron strips comprising each sector-shaped block $a$ are or may advantageously be secured together in any suitable manner, so that the said block of strips constitutes practically one piece that can be easily handled and arranged to form with the remaining similarly-shaped blocks $a$ the central portion of the transformer-core. For this purpose the said strips may, for example, be secured together by bolts $h$, Figs. 3, 4, and 5, that pass transversely through them at points below and above their junction with the top and bottom members $c$ and $d$, respectively, of the rectangular laminated iron plate of which they form the inner side or leg, the said bolts, if of conducting material, being covered with a sleeve $h'$, of non-conducting and non-magnetic material, or the strips may be held together by a correspondingly-shaped holder $i$, Fig. 6, of suitable sheet material, the outer ends of which may be secured to the block $a$ by insulated bolts $h$. A layer $j$ of suitable insulating material may be secured over the outer vertical surface of the block by the bolts $h$, or the strips composing each block $a$ may be caused to adhere one to another by suitable means, such as by coating them with shellac varnish and after putting them together heating them in an oven to a temperature sufficient to expel the spirit, so that in each case the strips are effectually held together.

The several groups of strips constituting each block $a$ may, as shown in Fig. 7, be separated from one another by layers $k$ of non-magnetic material, which may be insulating or not, or, as shown in Fig. 8, by air-spaces $l$, formed by placing strips $m$ of non-magnetic material between the groups of strips in order in each case to prevent magnetic flux leaking from one group of strips to another.

Instead of binding the strips of iron in each block $a$ together, so that they can be handled as one article, as in Figs. 2 to 6, inclusive, the several groups of iron strips of different width constituting each block $a$ may be forced into position between stepped plates that are suitably held in position. For this purpose two plates $k$ may, as shown in Figs. 9 and 10, be held between top and bottom plates $c$ and $d$ and have their adjacent inner ends $n$ fixed in a slotted centrally-arranged pillar $r$, their outer ends being each provided with upper and lower projecting parts $s\ s'$, that are bent in opposite directions, so that one or some of them—viz., $s$—will bear against the block $a$, embraced by the said plates $k$, and the others or other—viz., $s'$—will bear against the adjacent block $a$, the several parts $s$ and $s'$ being maintained in the position shown by intermediate rods $t$, which are held in place by the plates $c$ and $d$. By these means the several plates $k\ k$ are rigidly interconnected and held firmly in position during the insertion between them of the strips of iron to form the blocks $a$.

The strips of iron in each sector-shaped block $a$ instead of being arranged and connected together to form one block having stepped sides may, as shown in Fig. 11, be arranged to form two blocks, the adjacent surfaces $a'$ of which are plane and the outer surfaces of which are stepped.

By the construction hereinbefore described not only can the central portion of the transformer-core be more readily built up than heretofore, but the desired section of iron to form the central portion of the core of a transformer for any required output can be arranged within a circle of smaller diameter than heretofore, with the result that the primary and secondary windings $p$ and $q$, Figs. 1 and 2, and transformer-core for any given transformer can be made of smaller diameter, and therefore of less cost, than with my previous constructions of transformers.

The strips of iron in each sector-shaped block $a$ are arranged, as shown in Figs. 1, 4, and 5, so that the ends of alternate strips project beyond or overlap the intermediate strips and form spaces $u$, into which the similarly-projecting or overlapping ends of the iron strips forming the top and bottom members $c$ and $d$ of the corresponding laminated iron plate project, so as to form butt and lap joints therewith, as in the construction of transformer-core described in my said former specification.

The strips of iron forming the top and bottom members $c$ and $d$ and the outer side or leg $b$ of each laminated iron plate may be variously arranged. Thus the strips to form the top member and also those to form the bottom member may be arranged close together, so as to form one group or bundle of strips, as shown at $v$ in Fig. 12, or they may be arranged in several groups corresponding, it may be, to the several groups composing the corresponding inner side or leg to which they are jointed and arranged to slightly diverge from each other, as shown at $w$ in Fig. 12. The strips of iron forming the outer side or leg $b$ of each laminated plate may be arranged to form, as seen in plan, either a sector or approximately sector shaped block, like the inner side or leg $a$ of the laminated plate and as shown at $x$ in Fig. 12, or a rectangular-shaped block, when the strips constituting the top member $c$ of the plate form a single group or bundle, as shown at $v$ in Fig. 12 and in Fig. 2, and those constituting the bottom member $d$ also form a single group or bundle, or the said strips may be arranged to form several blocks or bundles each of rectangular shape in plan, when the strips in the top and bottom members $c$ and $d$ are arranged in several groups, as shown at $w$ in Fig. 12. The ratio between the sectional areas of the corresponding groups of strips in the inner and outer sides or legs of each plate should be maintained as nearly equal as possible throughout the several groups of strips in each laminated plate in order to prevent magnetic flux passing sidewise from one group of strips to the next adjacent group or groups of strips.

To adapt a transformer of the type described for transforming polyphase currents, each of the laminated plates $a\ b\ c\ d$ is constructed with one or more intermediate members of laminated iron, so as to form two or more holes through the plates for the passage of two or more sets of primary and secondary windings and two or more independent circuits for magnetic flux. The laminated plates $a$, $b$, $c$, and $d$ (seen at the right of Fig. 1) are shown provided with two transverse members 1, each composed of straight strips of iron, so that each plate thus formed has three complete magnetic circuits around the three sets of primary and secondary coils $p$ and $q$, which extend through the plates, the transformer being thus adapted for transforming triphase currents. For transforming diphase currents only one intermediate member 1 and two sets of windings would be used. By using more than two intermediate members 1 and more than three sets of windings the transformer will be adapted for use with electric systems involving any requisite number of phases greater than triphase. It will be seen that in each case the transverse member 1, or each such member, forms part of and is common to two adjacent magnetic circuits, so that a small amount of iron can be used and the transformer made compact. This is rendered possible by the fact that the magnetic flux set up in the two circuits, of which the said intermediate member forms a part, attains the maximum amount at different times in the two circuits. In transformers of the type herein referred to and others in which the primary and secondary windings are arranged one inside the other and extend through laminated plates or frames the heat generated in the mass of the windings, especially in the case of large transformers and when one winding is arranged between and in close contact with two other windings, cannot, with the constructions heretofore usually adopted, readily pass away, with the result that the insulation may be injured and the efficiency of the transformer reduced. To obviate this drawback, the windings have sometimes been made of such relative diameters as to leave a complete air-space between them; but this arrangement has the disadvantage that it reduces the efficient regulation of the transformer. To obviate all the foregoing disadvantages, one or more or each winding is at parts thereof that project beyond the laminated iron plates surrounding them bent away from the adjacent winding, so as to form ventilating or cooling passages that extend between the two adjacent windings in a direction at right angles to the direction of winding and through which air or other cooling medium can be caused to pass, so as to carry off heat and keep the interior of the combined windings cool, and this without interfering with the efficient regulation of the transformer. In Fig. 2 each of the two secondary windings $q$, arranged at the inner and outer peripheries of the central primary winding $p$, is at the parts between the laminated core-plates made with bends 2, that extend away from the primary coil $p$, so as to form therewith vertical air-passages 3, which extend at right angles to the plane of the windings and which will allow of air flowing between the adjacent primary and secondary windings and carrying off heat from the interior of the combined windings. As will be seen, by arranging the bends 2 between the laminated core-plates they will not interfere with the windings being brought as close together as possible at the active parts—viz., where the laminated plates surround them—so that the formation of the air-passages 3 will not materially interfere with the efficient regulation of the transformer.

My improved transformer may be built up substantially in the manner described in my said former specification; but in the present case the central cylindrical former or mandrel previously used for supporting the vertical strips to form the central portion of the transformer-core is dispensed with, the several sector-shaped blocks $a$ to form the central portion of the said core being simply arranged around a common center in close proximity to one another and being held between two end plates or supports, one of which holds the strips of iron to form the bottom members of the core-plates during the building up of the transformer.

What I claim is—

1. As a new article of manufacture, a laminated iron block made of sector or approximately sector shape in cross-section and adapted to form part of a transformer-core, said block being composed of a number of parallel strips of sheet-iron made of different widths and held firmly together, substantially as described.

2. As a new article of manufacture, a laminated iron block adapted to form part of a transformer-core and composed of strips of sheet-iron of different widths held firmly against each other with the widest strip or strips in the center and with the strips on each side of such widest strip or strips of successively less width, substantially as described.

3. As a new article of manufacture, a laminated iron block adapted to form part of a transformer-core and composed of groups of strips of sheet-iron placed side by side and held together, the groups being of different widths with the strips in each group of the same width.

4. As a new article of manufacture, a laminated iron block adapted to form part of a transformer-core and composed of strips of sheet-iron, said block comprising a central group of strips of iron having the greater width and on each side thereof a number of other groups of strips of iron of successively less width but with the strips in each group of the same width, substantially as described.

5. As a new article of manufacture, a laminated iron block adapted to form part of a transformer-core and composed of groups of strips of sheet-iron placed side by side and held together, the groups being of different widths with the strips in each group of the same width and with a layer of non-magnetic material between adjacent groups.

6. As a new article of manufacture, a laminated iron block adapted to form part of a transformer-core and composed of long straight parallel strips of sheet-iron of different widths held side by side with the ends of alternate strips arranged to overlap the corresponding ends of the intermediate strips.

7. As a new article of manufacture, a laminated iron block adapted to form part of a transformer-core and composed of groups of straight parallel strips of sheet-iron, the widest group or groups being arranged centrally with the groups on each side thereof of successively less width, the strips in each group being of the same width, and the ends of alternate strips being arranged to overlap the corresponding ends of the intermediate strips.

8. In an electrical transformer, the combination with the primary and secondary windings, of a laminated iron core the central portion of which, extending through the center of said windings is composed of strips of sheet-iron arranged in sets, each set being composed of strips of different widths arranged side by side, substantially as described.

9. In an electrical transformer, the combination with the primary and secondary windings, of a laminated iron core the central portion of which, extending through the center of said windings, is composed of strips of sheet-iron arranged in sets, each set being composed of strips of different widths arranged side by side, the widest strips being arranged at the center of the set and the strips on each side of the widest being of successively less width so as to form a sector or approximately sector shaped set of strips.

10. In an electrical transformer, the combination with the primary and secondary windings, of a laminated iron core the central portion of which, extending through the center of said windings, is composed of strips of sheet-iron arranged in sets, each set being composed of groups of strips of different widths with the strips in each group of the same width.

11. In an electrical transformer, the combination with the primary and secondary windings, of a laminated iron core the central portion of which, extending through the center of said windings, is composed of strips of sheet-iron arranged in sets, each set being composed of groups of strips of different widths with the strips in each group of the same width, the widest group or groups being arranged at the center of the set and the groups of successively less width being arranged at the opposite sides of the center group or groups, substantially as described.

12. In an electrical transformer, the combination with the primary and secondary windings, of a laminated iron core surrounding the said windings, and the central portion of which extends through the windings and is composed of a number of sector-like blocks or bundles of strips of iron, the strips in each block or bundle being arranged in groups of different widths, arranged side by side, and each composed of strips of the same width, substantially as described.

13. In an electrical transformer, the combination with the primary and secondary windings, of a laminated iron core surrounding the said windings, and the central portion of which extends through the windings and is composed of a number of sector-like blocks arranged around a common center and each composed of a central group of strips of iron, and on each side thereof, a number of groups of strips of iron of successively less width, the strips of iron in each group being of the same width, the said blocks being arranged so that holes or passages will be formed between their adjacent sides and between their inner ends, substantially as described.

14. In an electrical transformer, the combination with the primary and secondary windings, of a laminated iron core encircling said windings and comprising a central portion composed of straight strips of sheet-iron extending through the center of the windings and arranged to form a number of sector-like sets of strips that are arranged side by side and are of different widths, and top, bottom and outer vertical sets of straight strips that are interlocked with each other and with the central sets of strips, substantially as described.

15. In an electrical transformer, a transformer-core comprising a number of iron plates extending radially from the central portion of the core and each comprising laminated inner, outer, top and bottom members with one or more laminated intermediate members arranged to form two or more magnetic circuits, substantially as described for the purpose specified.

16. An electric transformer comprising two or more sets of primary and secondary windings, and a laminated radially-arranged iron core common to all the sets of windings but separately surrounding each set of windings so as to form an independent magnetic circuit for such set of windings.

17. An electric transformer comprising two or more sets of primary and secondary windings, a core built up of strips of iron arranged to form laminated plates extending radially from a center and surrounding each of said sets of windings and forming two or more magnetic circuits therefor.

18. An electric transformer comprising an iron core composed of iron plates extending radially from the central portion of said core and each comprising laminated inner, outer, top and bottom members with one or more laminated intermediate horizontal members, said members being arranged to form two or more openings through each plate, and primary and secondary windings extending through each of said openings, substantially as described for the purpose specified.

19. An electric transformer having primary and secondary windings arranged one inside the other and one of which is formed at intervals with bends arranged to form with the adjacent winding, a number of air-passages that extend in a direction at right angles to the plane of the windings, substantially as described for the purpose specified.

20. An electric transformer having primary and secondary windings arranged one inside the other and one of which is arranged between the others, the outer windings being each bent away from the center winding at intervals so as to form between the adjacent windings a number of air-passages that extend in a direction at right angles to the plane of winding, substantially as described.

21. An electric transformer having concentrically-arranged primary and secondary windings the winding on each side of the center one being of corrugated shape and arranged to bear against said center winding at intervals so as to form therewith a number of air-passages that are parallel to the axis of the windings, substantially as described.

22. An electric transformer comprising concentrically-arranged primary and secondary windings composed of an outer winding, an intermediate winding and an inner winding, and laminated iron plates surrounding said windings, the inner winding at points between said plates being bent away from said intermediate winding, substantially as described.

23. An electric transformer comprising concentrically-arranged primary and secondary windings composed of an outer winding, an intermediate winding and an inner winding, and laminated iron plates surrounding said windings, the outer winding at points between said plates being bent away from said intermediate winding, substantially as described.

24. An electric transformer comprising concentrically-arranged primary and secondary windings composed of an outer winding, an intermediate winding and an inner winding, and laminated iron plates surrounding said windings, the inner and outer windings being each bent away from said intermediate windings at points between said plates so as to form air-passages with said intermediate winding at its inner and outer surfaces, substantially as described for the purpose specified.

Signed at 77 Cornhill, in the city of London, England, this 2d day of January, 1901.

ARTHUR FRANCIS BERRY.

Witnesses:
WM. O. BROWN,
PERCY E. MATTOCKS.